UNITED STATES PATENT OFFICE.

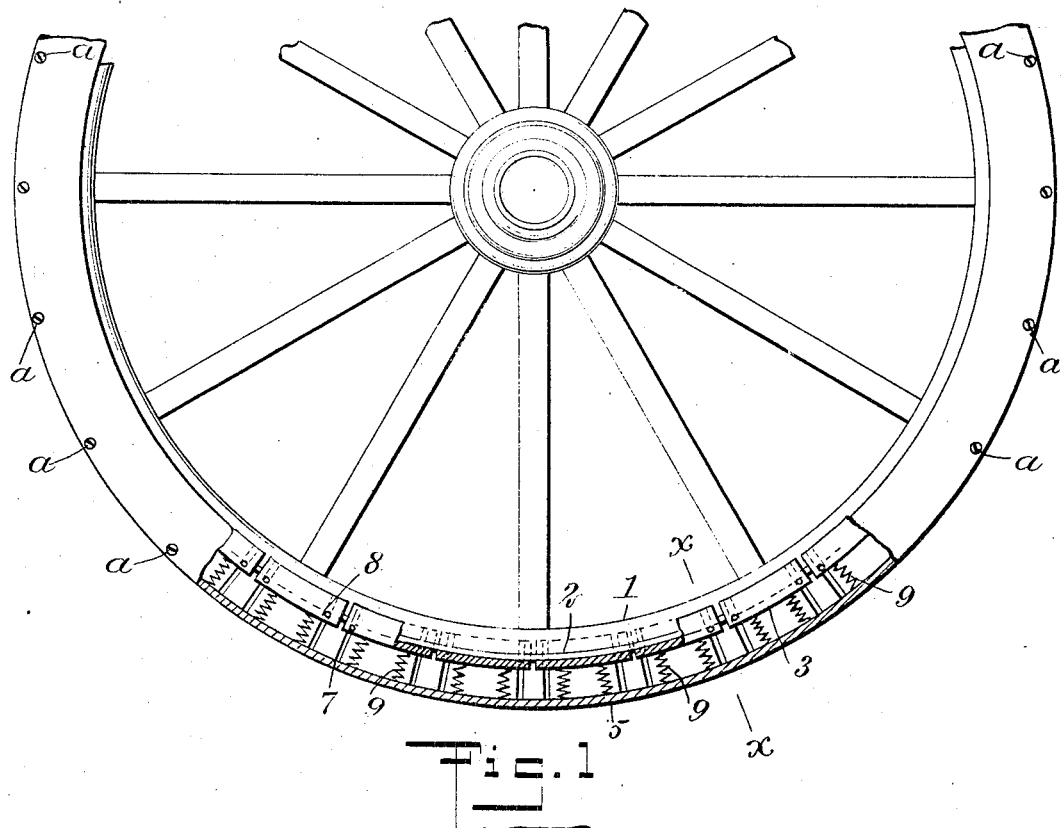
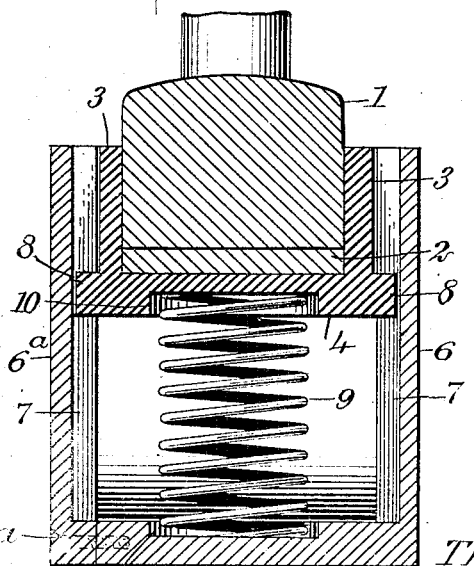

THOMAS T. CHALONER, OF NEW YORK, N. Y.

VEHICLE-WHEEL.

No. 839,728.  Specification of Letters Patent.  Patented Dec. 25, 1906.

Application filed May 8, 1906. Serial No. 315,791.

*To all whom it may concern:*

Be it known that I, THOMAS T. CHALONER, a citizen of the United States, and a resident of the city of New York, borough of Manhattan, in the county and State of New York, have invented a new and Improved Vehicle-Wheel, of which the following is a full, clear, and exact description.

This invention relates to improvements in yielding tires for vehicle-wheels, the object being to provide a yielding tire of novel construction that may be placed on a wheel having a metal tire and serve as a substitute for a pneumatic tire and having all the yielding qualities thereof without the danger of destruction by puncturing or wear. It may be stated, however, that my invention may be applied to a wheel having a pneumatic or a solid-rubber tire.

I will describe a vehicle-wheel embodying my invention and then point out the novel features in the appended claims.

Reference is to be had to the accompanying drawings, forming a part of this specification, in which similar characters of reference indicate corresponding parts in both figures.

Figure 1 is a side view of a portion of a vehicle-wheel, partly in section, illustrating my invention; and Fig. 2 is a section on the line $x\,x$ of Fig. 1.

Referring to the drawings, 1 designates the rim or felly of a wheel, which, as here shown, has an ordinary metal tire 2. Engaging over the rim is a plurality of box-like blocks having side portions 3 for engaging the sides of the wheel-rim and cross portions 4 for engaging with the periphery of the vehicle-wheel. These blocks consist of metal and are slightly spaced apart, so that the tire member may readily yield. This tire member consists of a tread portion 5 and side portions 6 6ª, which engage over the blocks on the wheel-rim, and the inner sides of the side portions are provided with channels 7 for receiving lugs 8 on the block members. Arranged between each block member and the interior of the tread portion 5 are coiled springs 9, the said block members being provided with depressions 10 for receiving the inner ends of the springs, while the tread 5 is provided with depressions 11 for receiving the outer ends of the said springs, thus preventing the displacement of the springs. The tire portion of course will be made of suitable metal, and in operation as a wheel revolves the portion of the tire engaging with the ground or pavement will yield toward the vehicle-wheel, thus serving, as before stated, as a substitute for a pneumatic or solid-rubber tire.

The side 6ª of the tire member is removable, so that it is obvious that the tire member may be readily placed upon a wheel and the side 6ª be subsequently secured in place by screws $a$.

Having thus described my invention, I claim as new and desire to secure by Letters Patent—

1. The combination with a vehicle-wheel, of a plurality of box-like blocks engaging over the wheel-rim, the said blocks being slightly spaced apart, a tire member consisting of a tread portion, and side pieces for passing over the outer sides of said blocks, the said side portions being channeled, lugs on the block members for engaging in said channels, and springs arranged between the block members and the tread of the tire.

2. The combination with a vehicle-wheel, of a plurality of box-like block members engaging over the rim of the wheel, lugs extended from opposite sides of said block members, the said block members having depressions, a tire member having a tread member, and side portions, one side portion being detachable, the said side portions engaging over the block members and provided with channels for receiving the lugs of the block members, the tread portion of said tire having depressions, and coiled springs engaging at one end in the depressions of the blocks and at the other end in the depressions of the tire.

In testimony whereof I have signed my name to this specification in the presence of two subscribing witnesses.

THOMAS T. CHALONER.

Witnesses:
FRANK J. KARSHICK,
CHARLES LAWTAR.